United States Patent
Nurse et al.

(10) Patent No.: US 9,558,596 B2
(45) Date of Patent: Jan. 31, 2017

(54) ALERTING PATIENT AT DOSING TIMES AND TRACKING MEDICINE USE

(71) Applicants: Lloyd Cleveland Nurse, Decatur, GA (US); Darien Okinza Nurse, Decatur, GA (US)

(72) Inventors: Lloyd Cleveland Nurse, Decatur, GA (US); Darien Okinza Nurse, Decatur, GA (US)

(*) Notice: Subject to any disclaimer, the term of this patent is extended or adjusted under 35 U.S.C. 154(b) by 0 days.

(21) Appl. No.: 14/269,810

(22) Filed: May 5, 2014

(65) Prior Publication Data

US 2014/0239062 A1    Aug. 28, 2014

Related U.S. Application Data

(63) Continuation-in-part of application No. 12/960,800, filed on Dec. 6, 2010, now Pat. No. 8,717,851.

(Continued)

(51) Int. Cl.
   *G04G 13/02*    (2006.01)
   *G07C 1/10*    (2006.01)
   (Continued)

(52) U.S. Cl.
   CPC .............. *G07C 1/10* (2013.01); *A61J 7/0436* (2015.05); *A61J 7/0481* (2013.01); *G04G 13/026* (2013.01);
   (Continued)

(58) Field of Classification Search
   CPC ........ G04G 13/026; G07C 1/10; G06K 19/00; G06K 19/06028; A61J 7/0481; A61J 2205/10; A61J 2205/60; A61J 7/049; A61J 7/0454; A61J 7/0436; A61J 7/0445
   See application file for complete search history.

(56) References Cited

U.S. PATENT DOCUMENTS 4,001,805 A    1/1977    Golbe
4,039,957 A    8/1977    Jennings
(Continued)

FOREIGN PATENT DOCUMENTS

WO    2010132503 A2    11/2010

OTHER PUBLICATIONS

Advisory Action issued in U.S. Appl. No. 13/168,324 on Feb. 6, 2014.

(Continued)

*Primary Examiner* — Sean Kayes
(74) *Attorney, Agent, or Firm* — LeonardPatel PC (57) ABSTRACT

Dosing times for medication may be tracked by taking into account preset dosing sequences and when users indicate that they have taken the medication. The medication may also be kept in its original container. An encoder disk may be attached to a medicine container. The encoder disk may be encoded with a dosing frequency that indicates how frequently the medication should be taken, as well as any other desired information. A base station may be configured to accept and hold one or more medicine containers. The base station may be configured to read the encoded dosage from the encoder disk, an RFID tag, a barcode, or another component capable of conveying dosing information, and detect when the medicine container is removed from and placed on the base station. The base station may also include various indicators of its current state.

19 Claims, 8 Drawing Sheets

Related U.S. Application Data (60) Provisional application No. 61/917,994, filed on Dec. 19, 2013.

(51) Int. Cl.
*G06K 19/00* (2006.01)
*G06K 19/06* (2006.01)
*G06K 19/07* (2006.01)
*A61J 7/04* (2006.01)

(52) U.S. Cl.
CPC ......... *G06K 19/00* (2013.01); *G06K 19/06028* (2013.01); *G06K 19/0723* (2013.01); *A61J 7/049* (2015.05); *A61J 7/0445* (2015.05); *A61J 7/0454* (2015.05); *A61J 2205/10* (2013.01); *A61J 2205/60* (2013.01)

(56) References Cited

U.S. PATENT DOCUMENTS

| | | | |
|---|---|---|---|
| 4,258,354 | A | 3/1981 | Carmon et al. |
| 4,490,711 | A | 12/1984 | Johnston |
| 4,630,248 | A | 12/1986 | Scott |
| 5,012,223 | A | 4/1991 | Griebell et al. |
| 5,408,443 | A | 4/1995 | Weinberger |
| 6,018,289 | A | 1/2000 | Sekura et al. |
| 6,129,446 | A | 10/2000 | Hornung |
| 6,198,383 | B1 | 3/2001 | Sekura et al. |
| 6,301,196 | B1* | 10/2001 | Daniel ............... 368/10 |
| 6,337,836 | B1 | 1/2002 | Eidelson |
| 6,529,446 | B1 | 3/2003 | Huerga |
| 6,545,592 | B2 | 4/2003 | Weiner |
| 6,667,936 | B1 | 12/2003 | Ditzig |
| 6,717,598 | B1 | 4/2004 | Melton et al. |
| 6,724,298 | B2 | 4/2004 | Smith |
| 6,812,825 | B1 | 11/2004 | Volk |
| 6,817,192 | B2 | 11/2004 | Ector et al. |
| 6,845,064 | B2 | 1/2005 | Hildebrandt |
| 6,934,220 | B1 | 8/2005 | Cruitt et al. |
| 7,158,011 | B2 | 1/2007 | Brue |
| 7,199,700 | B1 | 4/2007 | McPherson et al. |
| 7,330,101 | B2 | 2/2008 | Sekura |
| 7,362,660 | B2 | 4/2008 | Hildebrandt |
| 7,362,663 | B2 | 4/2008 | Kagan |
| 7,382,231 | B2 | 6/2008 | Blumberg |
| 7,454,257 | B2 | 11/2008 | McPherson et al. |
| 7,542,379 | B2 | 6/2009 | Kimel et al. |
| 7,545,257 | B2 | 6/2009 | Brue |
| 7,639,120 | B2 | 12/2009 | Sekura |
| 7,715,277 | B2 | 5/2010 | Huerga |
| 7,978,564 | B2* | 7/2011 | De La Huerga ............... 368/10 |
| 2003/0070681 | A1 | 4/2003 | Rydgren |
| 2003/0151499 | A1 | 8/2003 | Huang |
| 2004/0155780 | A1 | 8/2004 | Rapchak |
| 2004/0156418 | A1 | 8/2004 | Debord et al. |
| 2006/0017559 | A1 | 1/2006 | Albert |
| 2006/0061454 | A1 | 3/2006 | Debord et al. |
| 2006/0139150 | A1 | 6/2006 | Brue |
| 2006/0146654 | A1 | 7/2006 | Yeager |
| 2006/0167345 | A1 | 7/2006 | Vespasiani |
| 2006/0187002 | A1 | 8/2006 | Terenna |
| 2006/0187003 | A1 | 8/2006 | Terenna |
| 2006/0215495 | A1 | 9/2006 | Soled et al. |
| 2006/0227669 | A1 | 10/2006 | Pennaz et al. |
| 2006/0280035 | A1 | 12/2006 | Walker et al. |
| 2006/0285441 | A1 | 12/2006 | Walker et al. |
| 2007/0091726 | A1 | 4/2007 | Stauffer et al. |
| 2008/0068159 | A1 | 3/2008 | Bradus et al. |
| 2008/0074951 | A1 | 3/2008 | Hubicki |
| 2008/0080319 | A1 | 4/2008 | Niemiec et al. |
| 2008/0117719 | A1 | 5/2008 | Hildebrandt |
| 2008/0151695 | A1 | 6/2008 | Kimel et al. |
| 2009/0027213 | A1 | 1/2009 | Debord et al. |
| 2009/0040874 | A1 | 2/2009 | Rooney et al. |
| 2009/0109800 | A1 | 4/2009 | Kimel et al. |
| 2009/0209896 | A1 | 8/2009 | Selevan |
| 2009/0281835 | A1 | 11/2009 | Patwardhan et al. |
| 2010/0219351 | A1* | 9/2010 | Roberts ............... A61N 1/025 250/393 |
| 2010/0220553 | A1 | 9/2010 | Nurse et al. |
| 2010/0278016 | A1* | 11/2010 | Sandu ............... A61M 21/00 368/10 |
| 2011/0041845 | A1 | 2/2011 | Solomon et al. |
| 2012/0113761 | A1* | 5/2012 | Chen et al. ............... 368/10 |

OTHER PUBLICATIONS

Final Office Action issued in U.S. Appl. No. 12/960,800 on Aug. 29, 2013.
Final Office Action issued in U.S. Appl. No. 13/168,324 on Dec. 6, 2013.
First Notice of Allowance issued in parent U.S. Appl. No. 12/466,332 on Mar. 24, 2011.
International Search Report issued in PCT Application No. PCT/US10/34448 on Jan. 20, 2011.
Non-final Office Action issued in U.S. Appl. No. 12/960,800 on Mar. 20, 2013.
Non-Final Office Action issued in U.S. Appl. No. 13/168,324 on Aug. 27, 2013.
Non-final Office Action issued in U.S. Appl. No. 13/168,324 on May 8, 2014.
Non-final Office Action issued in parent U.S. Appl. No. 12/466,332 on Sep. 22, 2010.
Notice of Allowance issued in U.S. Appl. No. 12/960,800 on Dec. 5, 2013.
Phillip Sean Kayes, 'Non-Final Office Action' issued on May 8, 2014 for U.S. Appl. No. 13/168,324.
Second Notice of Allowance issued in U.S. Appl. No. 12/466,332 on Apr. 11, 2011.

* cited by examiner

ALERTING PATIENT AT DOSING TIMES AND TRACKING MEDICINE USE

CROSS REFERENCE TO RELATED APPLICATIONS

This application is a continuation-in-part of, and claims priority to, U.S. patent application Ser. No. 12/960,800, filed Dec. 6, 2010. This application also claims the benefit of U.S. Provisional Patent Application No. 61/917,994, filed Dec. 19, 2013. The subject matter of these earlier filed applications is hereby incorporated by reference in its entirety.

FIELD

The present invention generally pertains to medication adherence, and more particularly, to a system for automatically alerting a person at medicine dosing times and tracking medicine use while keeping the medicine in its original container.

BACKGROUND

Delivering medication accurately with a reduced possibility for error and recording the direct, short, and long term effects of a medication or combination of medications on the vital signs or other conditions of patients in between doctor or hospital visits presents a challenge for the medical industry. Also, patients may be apprehensive regarding the use of some medications, especially since medications may affect various patients differently or interact with other medications. Accordingly, relatively simple tools to reliably notify patients of dosing times and help patients to take medications responsibly with little or no extra effort may be beneficial. It may also be beneficial for pharmacists and patients to be better synchronized, such that a specific medication container can be tracked from the manufacturer to the patient by the pharmacy. This may reduce the potential for labeling and patient identity errors while permitting proper usage of each medication.

SUMMARY

Certain embodiments of the present invention may provide solutions to the problems and needs in the art that have not yet been fully identified, appreciated, or solved by current medicine notification systems. For example, some embodiments of the present invention track dosing times by recording when an alarm is stopped or when a medication container is placed into the assigned compartment. Also, fixed preset dosing intervals may ensure safe dosing separation even when a person is late taking a dose without having to miss that dose. In some embodiments, the system may use relative time for notifications and use the time of day to record the actual dosing time. The medication may be kept in its original container in certain embodiments.

In some embodiments, an encoder disk may be attached to a medicine container. The encoder disk may be encoded with a dosing frequency that indicates how frequently the medication should be taken, as well as any other desired information. In some embodiments, the encoder disk may be affixed to the bottom of the medicine container by a pharmacist, doctor, medicine manufacturer, or other authorized individual or entity. The encoder disk may also include a magnet to facilitate better adherence to a base station. A manufacturer may also make a medication container with a coded bottom portion.

In certain embodiments, a base station may be configured to accept and hold one or more medicine containers. The base station may be configured to read the encoded dosage from the encoder disk, an RFID tag, a barcode, or another component capable of conveying dosing information, and detect when the medicine container is removed from and placed on the base station. The base station may also include various indicators of its current state.

In an embodiment, an apparatus includes a tag encoded with dosing information for a medication. The apparatus is attached to or integrated with a medication container.

In another embodiment, an apparatus includes a medication compartment configured to hold a medication container and a computing system configured to control operation of the apparatus. The apparatus also includes a sensor located in the medication compartment configured to detect when the medication container is removed from the medication compartment and provide a signal to the computing system when the medication container is removed. The apparatus further includes at least one indicator configured to inform a user when it is time to take a medication. The computing system is configured to activate the at least one indicator when it is time for the user to take the medication. The computing system is also configured to track, based on the signal from the sensor, when the user has removed the medication container from, and placed the medication container back in, the medication compartment. In some embodiments, the computing system may be configured to display information on a video display identifying the dosage and usage instructions when a medication alert is activated or stopped, or a medication container is picked up or replaced.

In yet another embodiment, a system includes a medication container storing medication and a tag affixed to or integrated with the medicine container. The tag stores dosing information for the medication. The system also includes a base station configured to receive the dosing information from the tag. The base station includes a medication compartment configured to hold the medication container and a computing system configured to control operation of the base station. The base station also includes a sensor located in the medication compartment configured to detect when the medication container is removed from the medication compartment and provide a signal to the computing system when the medication container is removed. The base station further includes at least one indicator configured to inform a user when it is time to take a medication.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments pertain to an encoder disk configured to provide dosing information and a base station configured to hold a medicine container including the encoder disk. The base station is also configured to read dosing information encoded on the encoder disk. The base station may inform users of dosing times via light, sound, vibration, a video display, or any combination thereof. In certain embodiments, an alert device attached to or integrated with a medicine container may incorporate the features of the base station and encoder disk. In some embodiments, the base station may be configured to read the encoded dosage from an RFID tag, a barcode, or another component capable of conveying dosing information instead of, or in addition to, an encoder disk.

Figure 1A:
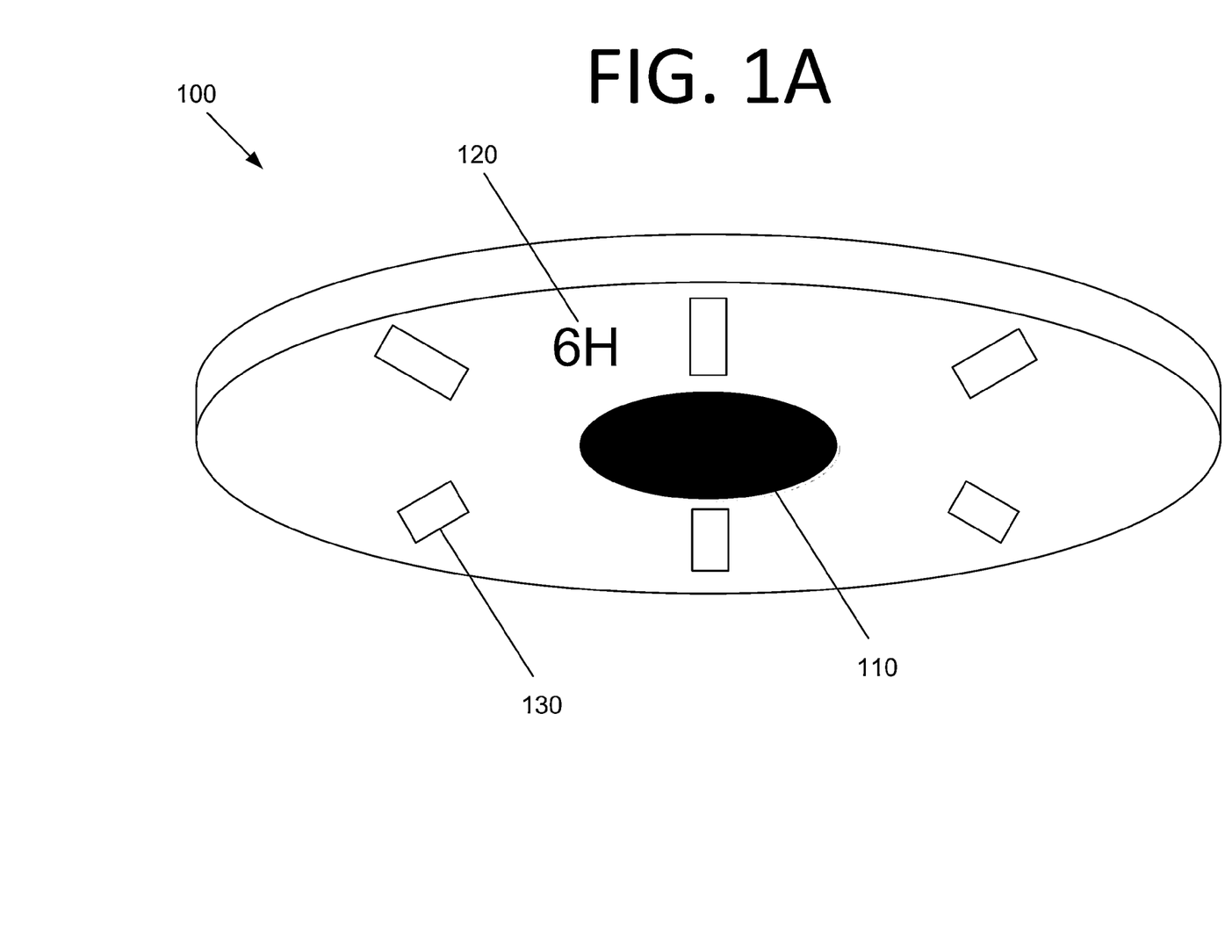
FIG. 1A is a perspective view illustrating the top of an encoder disk, according to an embodiment of the present invention.
Figure 1B:
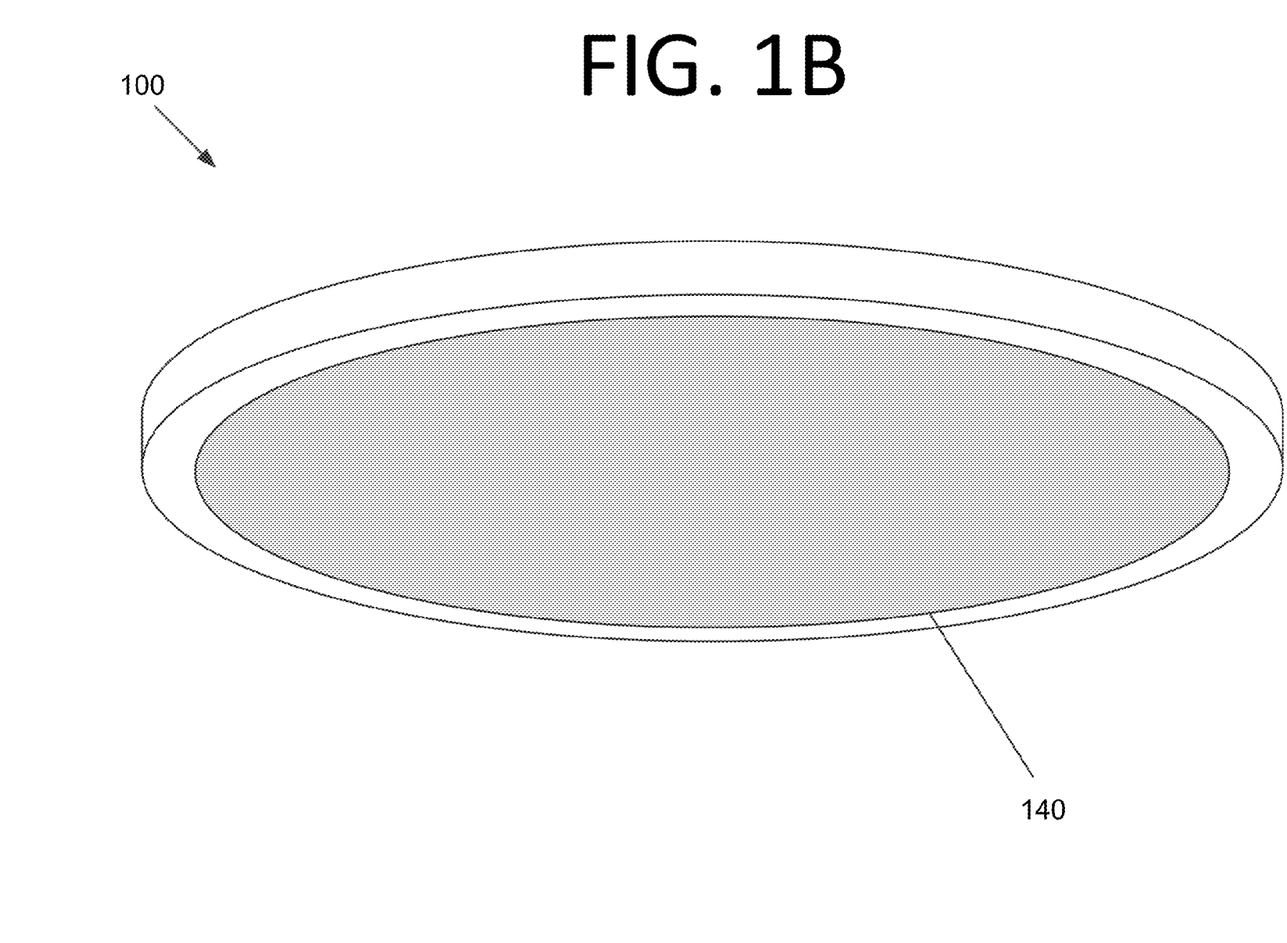
FIG. 1B is a perspective view illustrating the back of the encoder disk, according to an embodiment of the present invention.
Figure 1C:
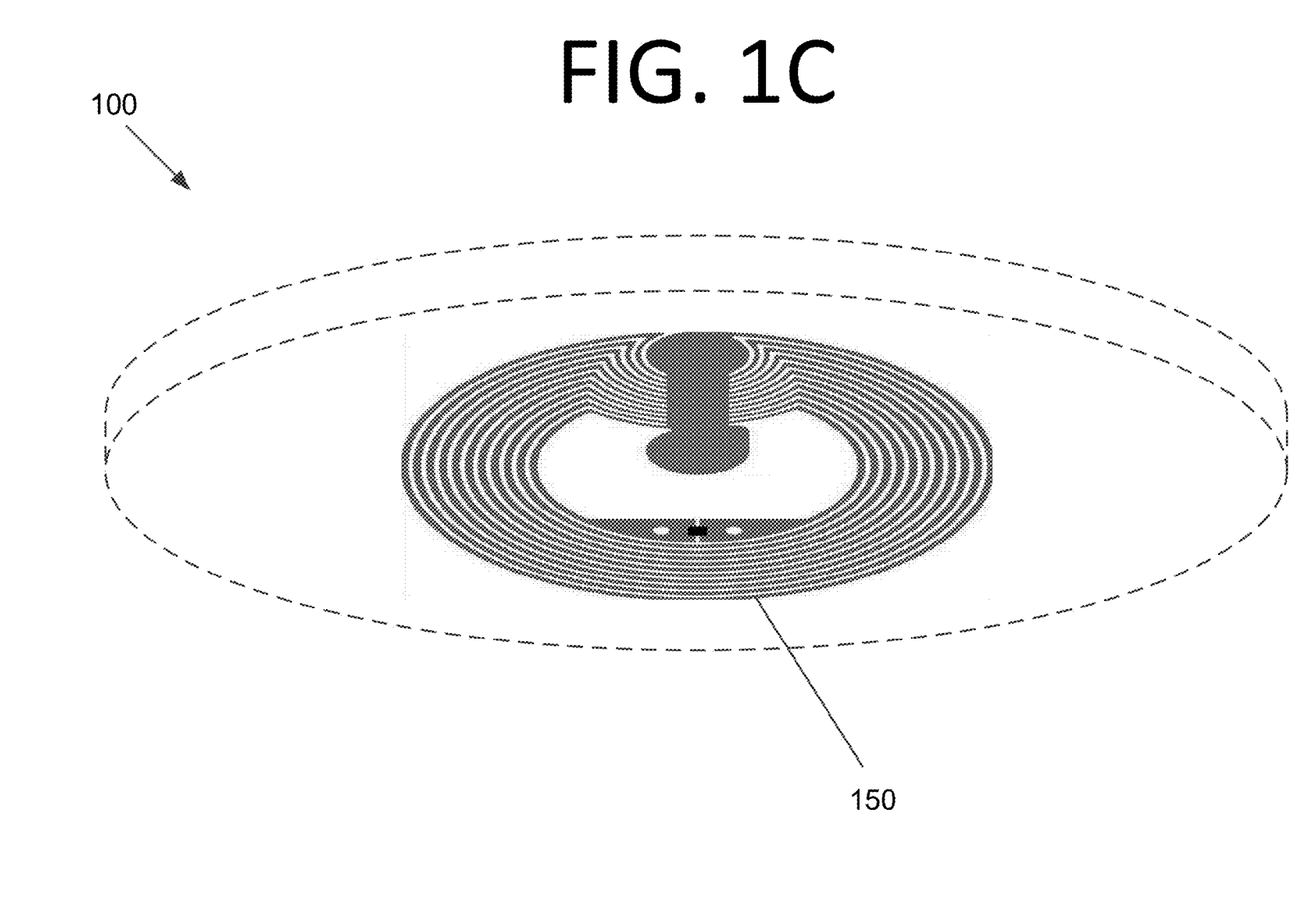
FIG. 1C is a perspective internal view illustrating the inside of the encoder disk, according to an embodiment of the present invention.
Figure 1D:
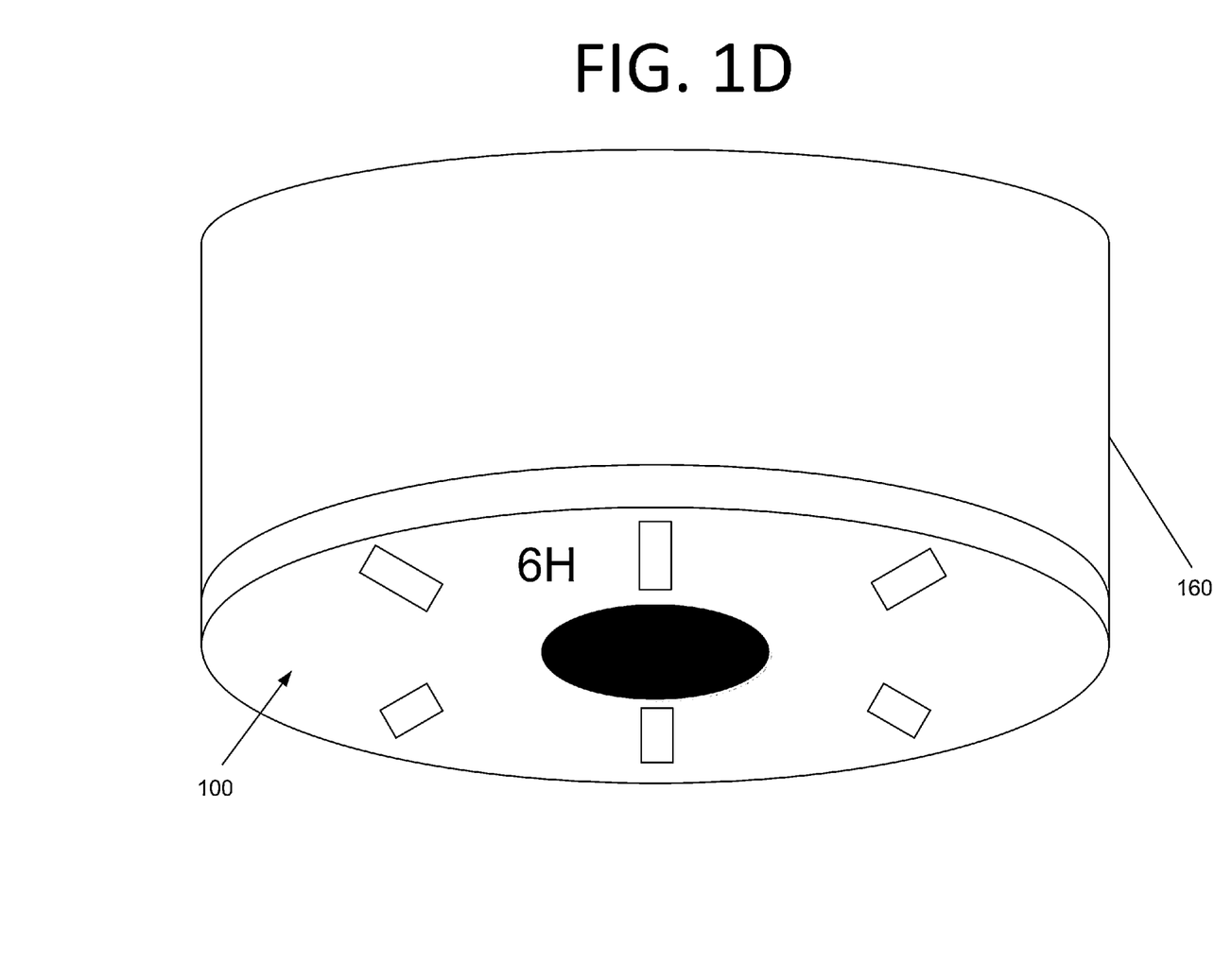
FIG. 1D is a perspective view illustrating the encoder disk attached to a medicine container, according to an embodiment of the present invention.

FIG. 1A is a perspective view illustrating the top of an encoder disk 100, according to an embodiment of the present invention. Encoder disk 100 includes a magnet 110, a dosage timing indicator 120, and six mechanical codes 130 that ensure activation of a desired timing sequence when the encoder disk is resting on a base identifier, such as a base station. An adhesive 140 on the back of encoder disk 100 may secure encoder disk 100 to the bottom of a medicine container 160, but any suitable securing mechanism may be used. See FIGS. 1B and 1D. However, in other embodiments, encoder disk 100 may adhere to another surface of medicine container 160, such as the cap or side. Furthermore, encoder disk 100 may have any desired shape or size, and need not be a disk at all. Any shape that can be attached to a medicine container will suffice. For instance, encoder disk 100 may be curved to match the surface of a medicine container of a given size. However, using a shape that attaches to the bottom or cap of the medicine container will likely have broader applicability and applicable container size ranges. Furthermore, attaching encoder disk 100 to the bottom of the medicine container helps to mitigate against placing the disk/cap on the wrong medicine container or losing the disk/cap.

A near field communication (NFC) tag 150 provides dosage information and/or other information to the base station. In other embodiments, a radio frequency identification (RFID) tag may be used instead, a barcode may be placed on medicine container 160, or any other suitable information conveyance technology may be used. In certain embodiments, a microcontroller (i.e., a small processor), transmitter, and battery may be included, but this would generally add cost to the design.

NFC tag 150 provides read and write access for 1024 bytes (1 kilobyte) in this embodiment. However, in other embodiments, any desired storage may be provided. Various data may be stored, including, but not limited to, a dosage code (e.g., a 2 digit alphanumeric code), a Boolean declinable code (i.e., a 1 digit code indicating whether the medicine can be declined for a single dose), a pill weight in milligrams (e.g., a 5 digit numeric code), an initial start time for dose (e.g. a 2 digit numeric code), the number of pills remaining (e.g., a 3 digit numeric code), a pharmacy phone number (e.g., a 15 digit numeric code based on the International Telephone Union (ITU)), a National Counsel for Prescription Drug Programs (NCPDP) provider identifier (a 15 digit alphanumeric code), a doctor's phone number (e.g., a 15 digit numeric code), a number of missed doses (e.g., a 2 digit numeric code), a prescription date (e.g., an 8 digit numeric code), a medication name (e.g., a 30 digit alphanumeric code), and/or a patient's last name (e.g., a 15 digit alphanumeric code).

In certain embodiments, encoder disk 100 may be encoded with only a predetermined dosage period (in this case, 6 hours). In such embodiments, encoder disks having multiple dosage periods may be manufactured, e.g., every hour, 2 hours, 4 hours, 6 hours, daily, twice daily, three times daily, four times daily, etc. A pharmacist, for instance, may then attach the appropriate encoder disk to medicine container 160 when filling a prescription.

Figure 2:
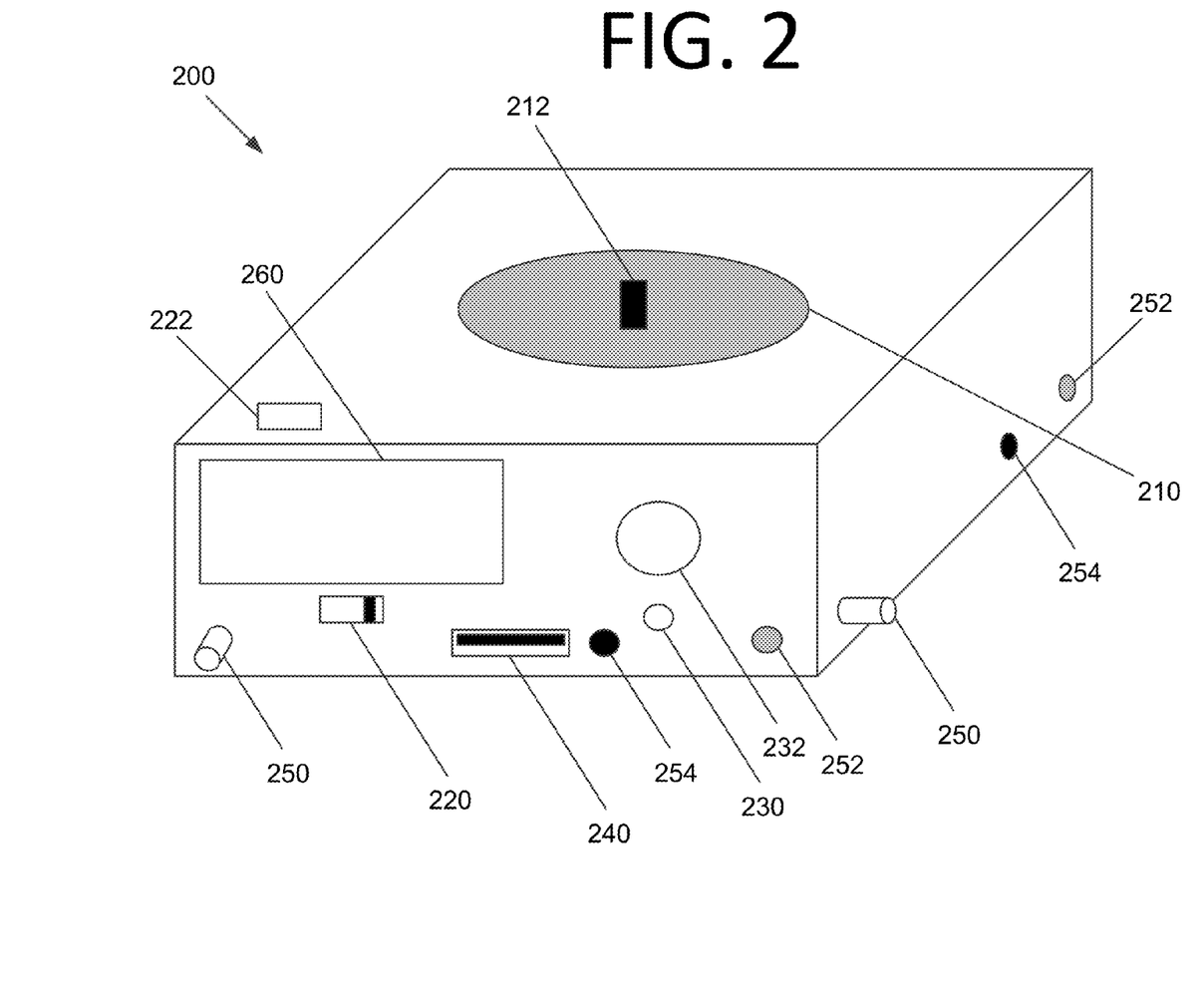
FIG. 2 is a perspective view illustrating a base station, according to an embodiment of the present invention.
Figure 5:
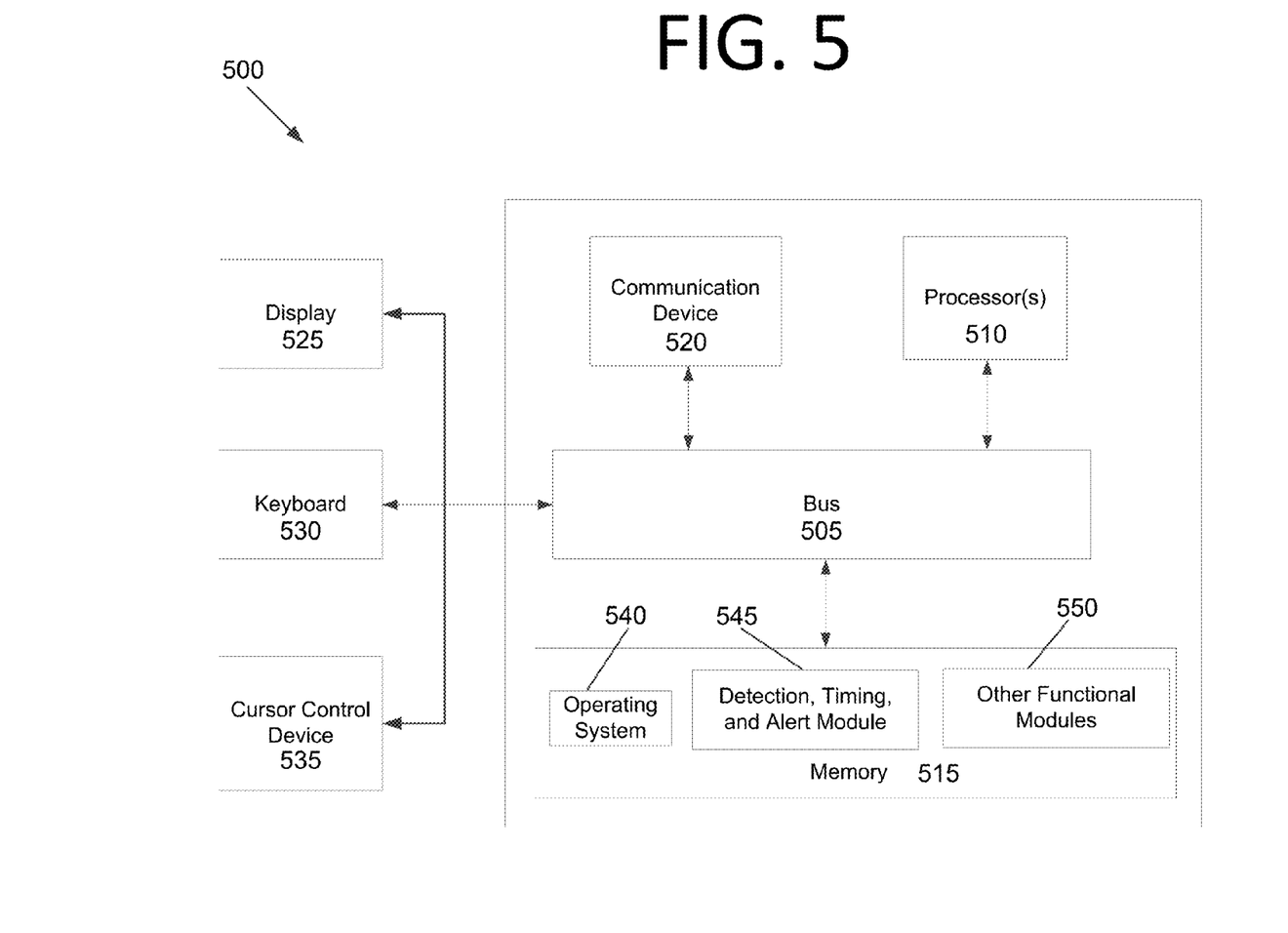

FIG. 2 is a perspective view illustrating a base station 200, according to an embodiment of the present invention. Base station 200 includes a medicine compartment 210 configured to hold a medicine container. Medicine compartment 210 may be sized such that it is capable of storing the majority of medicine containers having various shapes and sizes. In some embodiments, base station 200 may be configured to hold multiple medicine containers. A sensor 212 detects whether a medicine container is present and relays this information to an internal computing system (not shown). In some embodiments, the computing system may be computing system 500 of FIG. 5. Sensor 212 may also facilitate resetting of a timing sequence when the medicine container is replaced in the medicine compartment. Sensor 212 may further ensure that the correct medication is placed in the compartment.

A power switch 220 turns base station 200 on and off, and a light emitting diode (LED) power indicator indicates whether base station 200 is on. Power may be provided by a power source (not shown) connected to an electrical outlet, a battery (not shown), or both. An LED 230 and a speaker 232 flash and make noise to inform a user that it is time to take a medication. LED 230 and speaker 232 may also flash and make noise to remind a user to replace the medicine container, inform the user that no doses remain, or for any other reason or combination of reasons. Each message may have a different light signature and/or sound so the user can distinguish between messages. In certain embodiments, speaker 232 may relay a verbal message to the user. In some embodiments, there may be a tactile/vibratory button in each medicine compartment to aid the blind in differentiating active alerts. Operation of base station 200 is controlled by the computing system.

A universal serial bus (USB) port 240 facilitates communication with external computing systems, such as a personal computer, tablet computer, cell phone, specially manufactured electronic devices, or any other desired computing system. In certain embodiments, base station 200 may include a communication device (not shown) configured to facilitate wireless communication.

Pegs 250 and holes 252 allow base station 200 to connect to other base stations. In other words, the base stations are modular in this embodiment. A connector 254 allows base station 200 to communicate with other connected base stations. For instance, turning one base station on may turn on all other base stations, and/or base stations may all be controlled to provide alerts to facilitate a more powerful and noticeable alert. Alternatively, features of base station 200, such as LED 230, speakers 232, power switch 220, USB port 240, etc. may be located on top of base station 200 so they cannot be covered by other base stations. Base stations may be identical or may have different shapes and configurations.

A video display 260 displays various information and is controlled by the computing system. For instance, the computing system may cause video display 260 to display information identifying the dosage and usage instructions when a medication alert is activated or stopped, or a medication container is picked up or replaced. Any other desired information may be displayed as a matter of design choice.

Some embodiments use relative time that works off of an initial start time initiated by the user. Safe dosing intervals may be preset and may require action by the user to advance to the next dosing time, such as removing and replacing the container, pressing a button, etc. When no action is taken, base station 200 may inform another individual, such as a user's spouse, another relative, a friend, a doctor, etc. that the user ignored a dosing alert and did not take the medication, for example.

Figure 3:
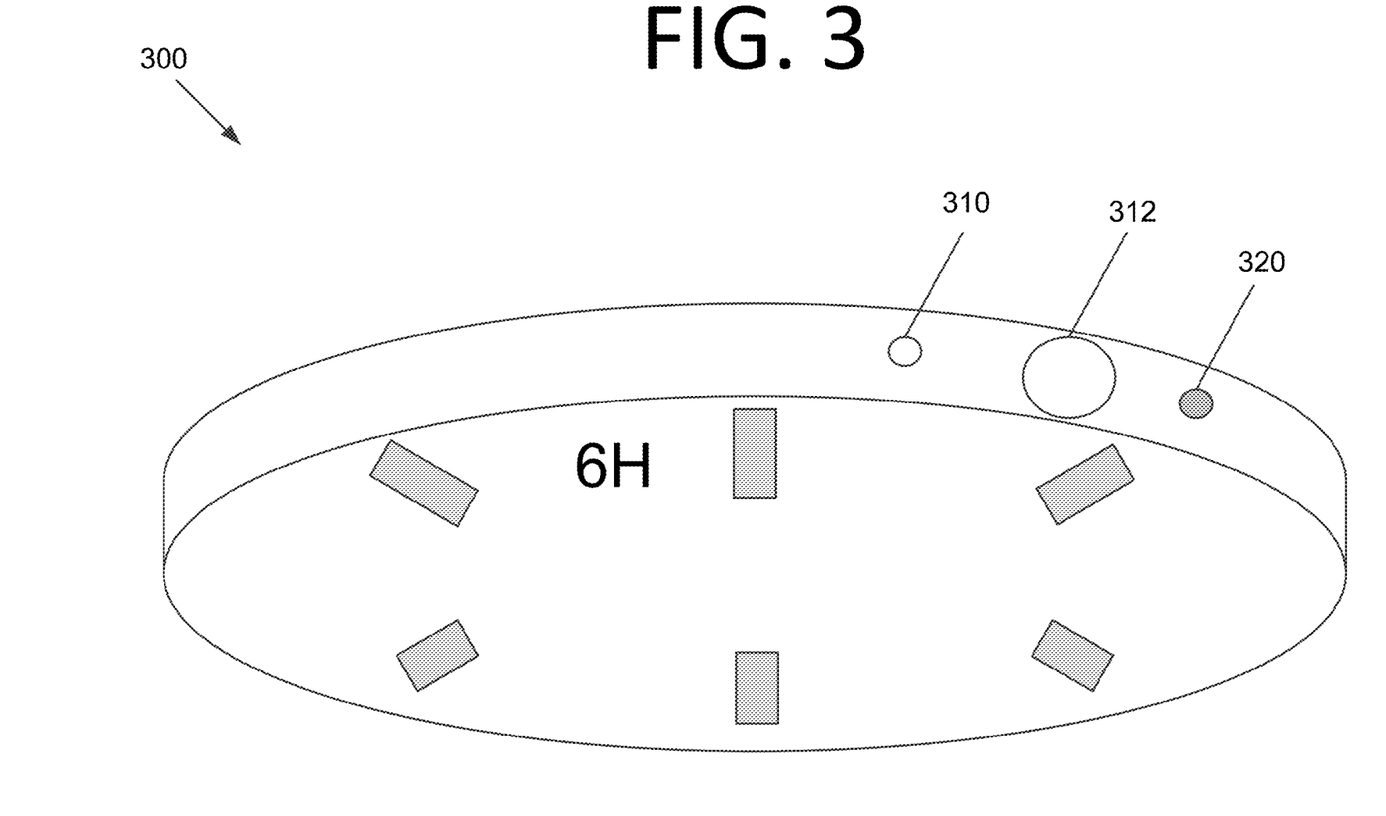
FIG. 3 is a perspective view illustrating an alert device, according to an embodiment of the present invention.

In some embodiments, at least some of the functionality of the base station and encoder disk may be integrated into a single package and attached to the medicine container. Such an embodiment is shown in alert device 300 of FIG. 3. In alert device 300, an LED 310 and a speaker 312 provide indications to a user that it is time to take a medication. The user may then take the medication and press acknowledgement button 320, which indicates that the dose has been taken. Alert device 300 may have an internal battery and computing system (both not shown). Such an embodiment may be particularly beneficial, and have its initial cost spread over time, when a medicine is to be refilled multiple times.

Some embodiments allow users to take medicine safely and accurately with no additional steps. In other words, users do not need to set timing mechanisms or track dosing. Such embodiments help to mitigate against missing medication or double dosing because a user forgot to take medication or forgot that he or she already took the medication. Also, medicines need not be moved out of their original labeled containers and into pill boxes. Furthermore, there is no need to register with other entities in order to get timely notifications.

In some embodiments, healthcare providers and other authorized professionals may have access to real-time information on medicine usage for each medication used by individuals who elect to have their medicine usage monitored remotely. Such information may be associated with other vital sign real-time data taken while a patient is at home or mobile. Critical corrections and adjustments may be made remotely by downloading a new dosage frequency or stopping the system from giving additional notifications for a medication. A message may be sent via a telephone call and/or a text message that notifies the user of the change so that he or she can verify that notifications are correct.

In some embodiments, the medicine container and an alert mechanism may be permanently attached to one another or be constructed as one unit. In paired embodiments, tag or mechanical matching features may ensure that a base unit with a specific dosing interval activates a container that is paired and has the associated preset dosing sequences. The container may not work with an unpaired unit so that errors are eliminated. Multiple base units with different preset timing intervals may be connected in a modular fashion in order to share power and other features. When only the dosing intervals need to be known and activated, a mechanical matching disk may be used. The base unit timer may also have only mechanically activated features. Electronic tags may be used for tracking medicine type and user information. An RFID tag may be recognized each time it is energized at reset. Information on that medication may be displayed at the point of use. Electronic tags may facilitate all needed functions in some embodiments, including dosing instructions to a base unit.

Medication containers may be seated on a base or suspended by a medication cap or other special container features in an elongated or tube-like standalone assembly in order to identify a container or turn a switch on or off. Some embodiments may require a special band around the medication container for mechanical interaction, identification, and other functions. When a container is removed from its assigned location, a tone may be emitted that may get louder until the container is replaced proximate its spot. Putting a different container in that spot may not stop the alert. When the alert stops, the next dosing time may be set.

Critical drugs may require that a pharmacist attach an identifier to a medication container that could be separate or included in the label. With the action of labeling, a pharmacist may attach medicine details, set electronic dosing intervals, and apply a tracking tag. Access to medication usage information via the tag may be optional in certain embodiments, but in some embodiments, it may be automatic and mandatory. A person that does not exhibit regular use may be getting rid of all the medication and may require additional attention.

Some embodiments provide a device for alerting at medicine dosing times that does not require moving medicine from the original dispensed container. A person may be alerted by preset dosing sequences. The entire medicine container may be placed within a compartment that has an associated timing element. A passive physical identifying feature may be attached to a medicine container that differentiates one medication sequence from another and indicates the time interval required for that medicine.

In some embodiments, a compartment may be configured to work only with a coordinated medicine container and/or a passive or active electronic tag. Each medicine to be taken may be associated with a fixed timing sequence device that can identify the required dosing intervals of the medication. An identifying tag may be embedded or attached into ballast or magnets. The tag may identify the dosing sequence of the medicine within a container.

Some embodiments include a controller (i.e., a processor) that has a programmable timer. The controller may control a speaker or other noisemaking device. The controller may be powered by an ordinary residential outlet or battery backup from within. The controller may activate a light source at the end of a timing cycle. The controller may activate a vibratory mechanism at the end of each timing cycle. The controller may count and display the number of times the medicine container is picked up and replaced into its assigned compartment. The controller may be activated when a medicine container is removed from or replaced in a medicine compartment. The controller may include memory storing information relating to medicine interactions.

In some embodiments, the system may require a person to do no more than they would normally do to take a medication, except for placing a medicine container in a specific spot. The system may notify the user when the medication container is not placed or replaced in its assigned location. The system may go into a super alert mode (i.e., an amplified mode that is louder or otherwise more noticeable) if medicines are removed from their assigned location for longer than it typically takes to take a dose of that medication.

Some embodiments provide a system and method for counting and logging the number of times a medication container is removed and replaced into its assigned compartment. The system may identify medicines that have negative interactive consequences. The system may act as a backup to human memory for the responsible use of medicines. Some embodiments address concerns over language differences when prescriptions are in a foreign language relative to the language of the user.

Some embodiments monitor another person's use of medicine by providing remote monitoring functionality. The system may automatically maintain a consistent, safe separation between dosing notifications. A unique identifier may be attached to each medication container and provided via a barcode, an RFID tag, or engraved or otherwise imprinted with a laser at the time of purchase.

Some embodiments may record the instances of medication access to an account online. The user and others may be notified that medication access is late. Information may be provided to healthcare providers regarding the actual effect of a medicine or a combination of medicines on an individual. Base stations connected to the Internet or a cellular service may send a notification to the user's cell phone concurrently with, or at a preset time after, a dosing alert. The user may take the indicated medication and confirm the action to reset the base timer alert and record the medication access via a software application.

In some embodiments, the base station may be a countertop device with a shallow compartment and adjustable orifice configured to accommodate a single medication container of various shapes and sizes and made of plastic or composite material. The system may include one or more LEDs and noisemakers to function as indicators when dosing times are reached. The LEDs may remain lit or flash until a medicine container is replaced, and a tactile or vibratory button, or other vibratory component, may be included in each compartment that vibrates a medication container placed within that compartment so as to aid the blind in differentiating containers with an active alert.

This cell phone signal may originate from the base station using preset timing intervals. A signal to refill a mobile remote medicine container may be emitted by the base station until such action is taken if the medication is running out (e.g., 3 doses remain) or has already run out. While keeping medication in original containers provides a measure of safety, a person may choose to use a compartment as a medicine container without departing from the spirit of the invention in some embodiments.

A medicine compartment may be constructed with several preset dosing intervals and automatically select an interval depending on tag data on a label or other attachment of to a medication container. Sequence data may not need to be stored on the device. In some embodiments, a compartment may be constructed with a tubular design to permit suspending a medicine container in the compartment by the container cap and not have the container seated on the bottom of the compartment.

Some embodiments may require use of a special container cap and some container caps may be constructed to fit different sized medication containers. Some embodiments may include a telephone port for automatically calling a user when dosing is more than 30 minutes late, for example. Software may help identify medications with interactive qualities, medicines that are no longer needed in a medication regiment, and medicines that may have untended consequences on an individual.

Childproof caps have been used as a safety feature for decades. However, many children are still able to access the medication, and thus are still endangered. Some still lose their lives after getting past childproof caps. Additionally, childproofing features may make it difficult for some adults who are frail or have physical limitations to open these caps. Individuals with mental challenges may not be trusted to always take the correct amount of medicine. A wall unit utilizing various features discussed above may be constructed with dispensing and locking features. Compartments may be color-coded in addition to having written timing interval details.

The instant of medication access or the start of an alert may trigger the content of the medicine label and other information and instructions to be displayed on a screen of a separate or built-in computing device. This may help to teach persons about their medicines and may also help persons with deteriorating senses to avoid errors, such as taking another person's medication. Displayed information may include, but is not limited to, a picture and name of the individual and a picture and name of the medication. Instructions may include how to take the medicine and what to avoid, such as certain foods, alcohol, driving, other medications, and the use of illegal and over-the-counter drugs. Information may be audible and in any desired language.

Selecting and resetting of the initial start time and overriding functions when a person chooses to take a dose before the alert is given may be possible in some embodiments. Users who may want to take medicine whenever convenient but are still able to ensure safe separation, log usage details, and be alerted when the next dose is due to be taken may override the recommended dosing time. The system may accomplish this by an interactive process of restarting the timer of a medication compartment.

Certain embodiments may also be wall mounted to enable gravity feed and secure metering of medicines. Metering devices may be attached directly to medication containers or attached to a specially constructed medication compartment and be locked to prevent access to more than a single dose of medication at the prescribed time. Metering devices may employ other mechanical or electrical processes. Some embodiments may stop the alert and set the next dosing alert when a metering release is activated. Metering ensures that a person may only access the prescribed dose and may even require a key code worn on an armband or otherwise accessible to the individual to access that dose. Some embodiments of the system may activate a camera at the point of medication access in order to confirm and monitor the actions of certain patients who are at risk.

Some of the features and functions of some embodiments may be built directly into the device or, to reduce cost and increase functionality, the unit may be paired with a tablet or other computing system located proximate thereto. This may offload processing to a significantly more powerful system with no additional hardware cost. Locking features of the devices with ID release, keypad functions, Wi-Fi connectivity, vital sign data provided by other devices, reporting, and conferencing may be enhanced.

While medication management is of primary concern, the recording of the effect of medicine in real time on vital signs and the general state of health of individuals is an important goal of some embodiments. Some embodiments record data transmitted from vital sign monitors in proximity by wired or wireless communication. A computing device with a display may be mounted on a bathroom wall, for example, may greet individuals entering the room, ask for identification, and provide notifications and instructions. For example, a user may be asked to step on a scale or hold a blood pressure monitor. A user may request a video or audio conference or be asked to participate in a video or audio conference by a care provider. Cameras may also be turned on automatically when medicines are accessed or manually for any desired reason.

Figure 4:
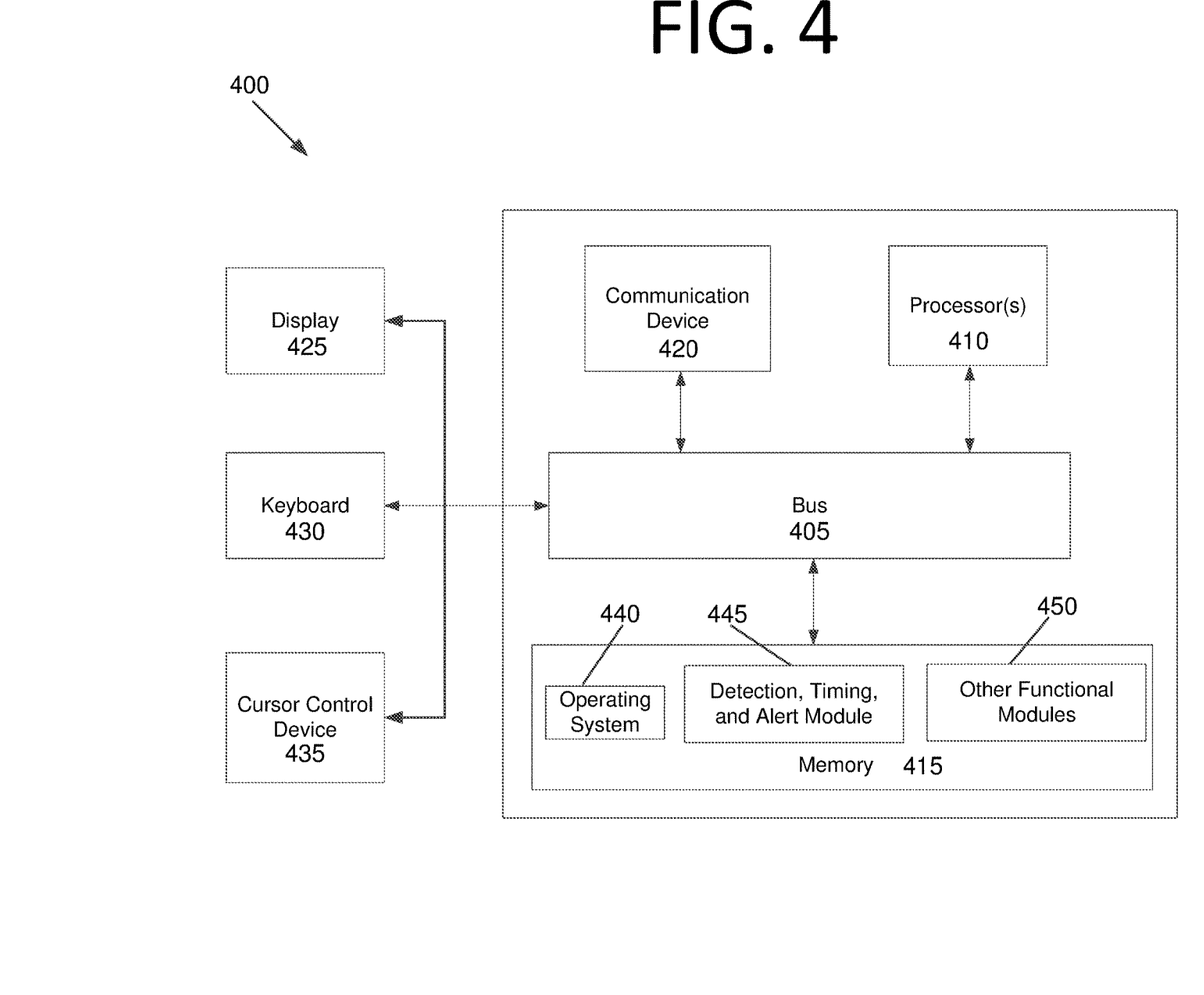
FIG. 4 is a block diagram of a computing system configured to alert users of medication dosing times, according to an embodiment of the present invention.

FIG. 4 is a block diagram of a computing system 400 configured to alert patients of medication dosing times and track adherence, according to an embodiment of the present invention. Computing system 400 includes a bus 405 or other communication mechanism for communicating information, and processor(s) 410 coupled to bus 405 for processing information. Processor(s) 410 may be any type of general or specific purpose processor, including a central processing unit ("CPU") or application specific integrated circuit ("ASIC"). Processor(s) 410 may also have multiple processing cores, and at least some of the cores may be configured to perform specific functions. Computing system 400 further includes a memory 415 for storing information and instructions to be executed by processor(s) 410. Memory 415 can be comprised of any combination of random access memory ("RAM"), read only memory ("ROM"), flash memory, cache, static storage such as a magnetic or optical disk, or any other types of non-transitory computer-readable media or combinations thereof. Additionally, computing system 400 includes a communication device 420, such as a transceiver, to wirelessly provide access to a communications network.

Non-transitory computer-readable media may be any available media that can be accessed by processor(s) 410 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor(s) 410 are further coupled via bus 405 to a display 425, such as a Liquid Crystal Display ("LCD"), for displaying information to a user. A keyboard 430 and a cursor control device 435, such as a computer mouse, are further coupled to bus 405 to enable a user to interface with computing system 400. However, in some embodiments, a physical keyboard and mouse may not be present, and the user may interact with the device solely through display 425, a touchpad (not shown), and/or via one or more buttons (not shown). Any type and combination of input devices may be used as a matter of design choice. Furthermore, in certain embodiments, no such input devices may be present, and computing system 400 may operate automatically without additional user input.

In one embodiment, memory 415 stores software modules that provide functionality when executed by processor(s) 410. The modules include an operating system 540 for computing system 400. The modules further include a detection, timing, and alert module 445 that is configured to track container position and medication dosing times and provide alerts, as well as perform any of the other functionality described above for devices of various embodiments. Computing system 400 may include one or more additional functional modules 450 that include additional functionality.

One skilled in the art will appreciate that a "system" could be embodied as a personal computer, a server, a console, a personal digital assistant (PDA), a cell phone, a tablet computing device, an embedded chip, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus for tracking movement of an originally dispensed medication container from a manufacturer to a consumer via a retailer, comprising:
   a tablet or other computing system with a display;
   a compartment device with one or more compartments configured to hold medication containers assigned to one of the one or more compartments;
   a tag or label attached to or integrated with each medication container; and
   a timing mechanism with unchangeable fixed period timing intervals associated with each compartment or implemented by the tablet or other computing device, wherein
   the tablet or other computing system is configured to record a user's vital signs, real-time medication container movements, and stopping and starting of timer alerts.

2. The apparatus of claim 1, wherein the tag comprises a radio frequency identifier (RFID) tag, near field communication (NFC) tag, a barcode, or any combination thereof.

3. The apparatus of claim 1, wherein the tag or label stores a dosage code, a Boolean declinable code, a pill weight in milligrams, an initial start time for dose, a number of pills remaining, a pharmacy phone number, a National Counsel for Prescription Drug Programs (NCPDP) provider identifier, a doctor's phone number, a number of missed doses, a prescription date, a medication name, a patient's last name, or any combination thereof.

4. The apparatus of claim 1, wherein the tag or label is encoded with a predetermined, unchangeable dosing period.

5. The apparatus of claim 1, further comprising:
   an indicator on each compartment and the tablet or other computing device that emits a signal at an end of every fixed period timing interval for each medication.

6. The apparatus of claim 1, further comprising:
   a sensing switch associated with a timing element within each compartment, the sensing switch configured to automatically start a timer, stop an alert, or start the alert upon detecting movement of a medication container into and/or out of the assigned compartment.

7. The apparatus of claim 1, wherein the tablet or other computing system pairs by wired or wireless communication with the compartment device, the tablet or other computing system configured to record instances of starting and stopping of alerts to an online account.

8. An apparatus, comprising:
   a plurality of medication compartments configured to hold one or more assigned medication containers with timers, preprogrammed with fixed dosing intervals that emit an alert at respective dosing times, wherein a time of day of an alert is set automatically, relative to when an assigned container is moved into an assigned compartment or an alert is stopped and a recording is made of the time of day of each alert event, each removal event, and each replacement event;
   a computing system configured to control operation of the apparatus;
   a sensor located in each respective medication compartment configured to detect when the one or more assigned medication containers assigned to the respective medication compartment of the sensor are removed from the respective medication compartment and to provide a unique signal to the computing system when the one or more assigned medication containers are removed that can be used to identify the assigned compartment; and
   at least one indicator configured to inform a user when it is time to take a medication, wherein
   the computing system is configured to:
      activate the at least one indicator when it is time for the user to take the medication, and
      track, based on the signal from the sensor, when the user has removed the medication container from, and placed the medication container back in, the assigned medication compartment, and
   each respective timer for each respective medication container is activated by placing the medication container in the assigned medication compartment.

9. The apparatus of claim 8, wherein the computing system is further configured to cause the at least one indicator to alert the user when a medication container has not been replaced in the assigned medication compartment within a predetermined period of time.

10. The apparatus of claim 9, wherein the computing system is further configured to cause the at least one indicator to generate different signatures of light, sound, and/or vibration for each different type of alert.

11. The apparatus of claim 8, wherein the computing system is further configured to send data to another computing system informing the other system of the user's dosing schedule and/or adherence.

12. The apparatus of claim 8, wherein the computing system is further configured to receive a confirmation from the user that the medication has been taken and reset a fixed interval timer for the medication.

13. The apparatus of claim 8, further comprising:
a video display, wherein the computing system is further configured to display information on the video display identifying dosage and usage instructions when a medication alert is activated or stopped, and when a medication container is picked up from or replaced in a compartment.

14. The apparatus of claim 8, wherein the base station is further configured to call or text the user's cell phone to inform the user that it is time to take a dose of the medication.

15. A system, comprising:
a plurality of medication containers storing respective medication;
a plurality of encoder disks affixed to or integrated with each respective medicine container and comprising respective timers preprogrammed with fixed dosing intervals that emit an alert at respective dosing times, each encoder disk storing dosing information for the respective medication; and
a base station configured to receive the dosing information from each respective encoder disk, the base station comprising:
a computing system configured to enter a respective time into a user account when each respective alert is stopped, and
at least one indicator configured to inform a user when it is time to take a medication, wherein
each respective timer for each respective encoder disk is activated by pressing a start button.

16. The system of claim 15, wherein the tag stores a dosage code, a Boolean declinable code, a pill weight in milligrams, an initial start time for dose, a number of pills remaining, a pharmacy phone number, a National Counsel for Prescription Drug Programs (NCPDP) provider identifier, a doctor's phone number, a number of missed doses, a prescription date, a medication name, a patient's last name, or any combination thereof.

17. The system of claim 15, wherein the base station is further configured to cause the at least one indicator to generate different signatures of light, sound, and/or vibration for each different type of alert.

18. The system of claim 15, wherein the base station further comprises a video display, the base station further configured to display information on the video display identifying dosage and usage instructions when a medication alert is activated or stopped, and when a medication container is picked up from or replaced in a compartment.

19. An apparatus for tracking movement of an originally dispensed medication container from a manufacturer to a consumer via a retailer, comprising:
a tablet or other computing system with a display;
a compartment device with one or more compartments configured to hold medication containers assigned to one of the one or more compartments;
a tag or label attached to or integrated with each medication container;
a timing mechanism with unchangeable fixed period timing intervals associated with each compartment or implemented by the tablet or other computing device; and
a sensing switch associated with a timing element within each compartment, the sensing switch configured to automatically start a timer, stop an alert, or start the alert upon detecting movement of a medication container into and/or out of the assigned compartment.

* * * * *